United States Patent [19]

Berger

[11] 3,814,944

[45] June 4, 1974

[54] MARK SENSE CARD READER

[75] Inventor: James K. Berger, Sherman Oaks, Calif.

[73] Assignee: Computer Design Corporation, Los Angeles, Calif.

[22] Filed: May 24, 1973

[21] Appl. No.: 363,649

[52] U.S. Cl. .................. 250/555, 250/214, 250/569, 307/311

[51] Int. Cl. .............................................. G08c 9/06

[58] Field of Search ......... 250/219 D, 219 DC, 206, 250/214 B, 555, 566, 567, 568, 569, 570; 307/311

[56] References Cited

UNITED STATES PATENTS

| | | | |
|---|---|---|---|
| 3,321,637 | 5/1967 | Beltz et al. | 250/219 DC X |
| 3,461,300 | 8/1969 | Braun | 250/219 D |
| 3,518,438 | 6/1970 | Hart et al. | 250/212 X |
| 3,708,678 | 1/1973 | Kreda | 250/219 D |

OTHER PUBLICATIONS

Kline: IBM Technical Disclosure Bulletin; Vol. 8, No. 9; pp. 1294, 1295.

*Primary Examiner*—Walter Stolwein
*Attorney, Agent, or Firm*—Lindenberg, Freilich & Wasserman

[57] ABSTRACT

In a circuit arrangement for responding to the presence or absence of a plurality of marks on a card, a means is provided for enabling each of a plurality of mark-sensing circuits to respond to the percentage change in the light reflected from the card, rather than to absolute light level changes, whereby the range of responses of the individual circuits is narrowed considerably and therefore the threshold which must be exceeded for the following detection circuits to respond, may be easily established.

4 Claims, 2 Drawing Figures

PATENTED JUN 4 1974 3,814,944

MARK SENSE CARD READER

BACKGROUND OF THE INVENTION

This invention relates to circuits for reading the presence or absence of marks on cards, and more particularly, to improvements therein.

Mark-sense readers, as they are called, are used to read the presence or absence of pencil marks in predetermined locations on a card. Usually the card is arranged to have rows and columns. There may be, for example, seven parallel columns in which these marks are placed, and usually, the card is moved under a mark-sense reader which reads a row of seven marks at a time. There may also be control marks, such as a "strobe" row, and a "cancel" row.

Present day mark-sense readers will use nine light emitting diodes to illuminate the nine rows of marks to be read; and nine light sensitive devices, such as phototransistors or photodiodes are used to respond to the reflected light. The output of each of the responding photosensitive devices is usually amplified, and then applied to a threshold circuit, or circuit which is biased so that it will provide an output when its input exceeds a predetermined threshold, whereby discrimination between the presence or absence of the marks is established. The output of the threshold circuits are then processed by following digital circuitry.

Because of the variations in the amount of light emitted by the light-emitting diodes, or other light sources which are used, there are variations in the amplitudes of the responses of the various photosensitive devices to the light reflected from the card. Other variables cause these response variations, such as variations in the color of the card, variations in the amount of current that photodiodes or phototransistors provide in response to a given light signal, etc. As a result, the setting of the thresholds for these various circuits is often a very delicate job and requires special tailoring for each circuit. Because of all the variables of the type mentioned, which are illustrative, and not a list of all of the factors involved, the range of photosensitive device responses that has to be accommodated may be almost 100 to 1. Attempts at solving this problem have been to try to match the light-emitting diode and the phototransistor so that, for example, a weak light-emitting diode would be coupled with a highly sensitive phototransistor, varying gain levels, biasing voltages, etc., in order to reduce the range that has to be accommodated.

OBJECTS AND SUMMARY OF THE INVENTION

It is an object of this invention to provide a sensing circuit for a mark-sense reader which responds to the percentage of change, rather than to the amplitude of the change.

Another object of this invention is the provision of a mark-sense reader circuit whose response occurs within a limited range despite variation in the light supplying and light responding circuit components.

Yet another object of the invention is the provision of a light detecting circuit for a mark-sense reader, which minimizes the adjustments required for detecting the presence or absence of marks with a plurality of these circuits.

These and other objects of the invention are achieved in a circuit arrangement wherein a logarithmic load is employed for the light sensing circuit, whereby the circuit provides an output which varies as the rate of change of the light, rather than the amplitude of the change of the light, whereby adjustments in either circuit components or in detection levels are minimized.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
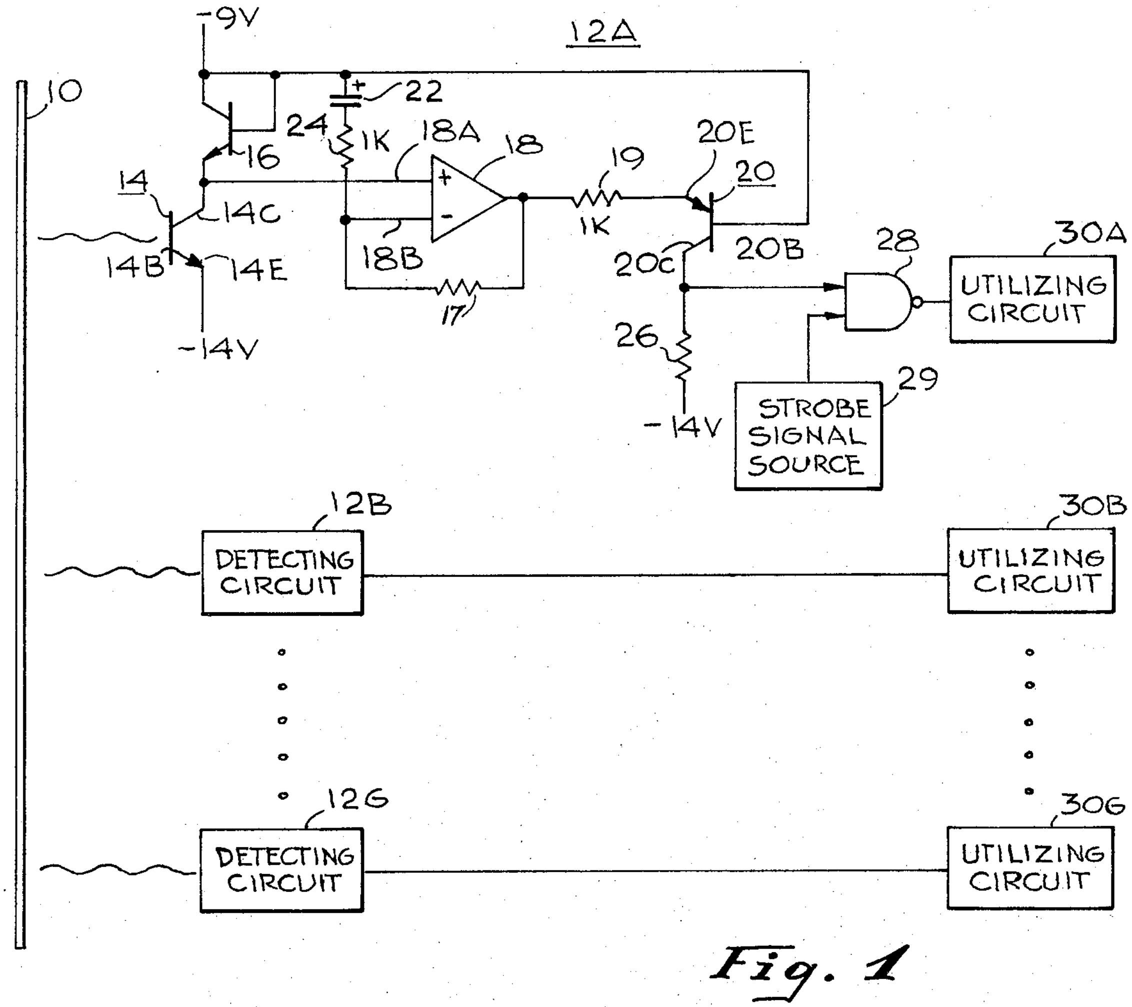
FIG. 1 is a circuit diagram of an embodiment of the invention.

Referring to the drawing, there may be seen a circuit, in accordance with this invention. A card 10, bearing marks which are to be read, is illuminated by photodiodes, or other means, not shown. Assuming that the card has seven marks per column, there are seven detecting circuits 12A through 12G provided, one for each mark to be read. Each detecting circuit includes a phototransistor 14, having a base 14B, collector 14C, and emitter 14E, electrode. The phototransistor base is illuminated by light reflected off the card. Its emitter is connected to a negative bias source, which is −14 volts, by way of example, and its collector is connected through a load to an operating voltage source, which is less negative than the source to which its emitter is connected, which is here exemplified by −9 volts. The load 16, connected between the collector and the bias source in accordance with this invention, is a load which provides logarithmic characteristics to the response of the phototransistor to light illumination, that is, with this load, the phototransistor output is determined by the ratio of the change in light levels rather than to the amplitude in the change of light levels.

A suitable logarithmic load may be a diode, however, a diode connected transistor which is what is shown in the drawing, provides better logarithmic characteristics and is preferred.

The collector 14C, is connected to one input of an operational amplifier 18. The output of the operational amplifier is fed back to its other input through a resistor 17, which, by way of example, has a value of 330 kilo ohms.

The output of the operational amplifier 18 is also connected through a resistor, having a value, by way of example, on the order of 1,000 ohms, to the emitter 20E of a transistor 20. The base of 20B of transistor 20, is connected back to the −9 volt source and is also connected to the same amplifier input as is the resistor 19, through a series connected capacitor 22, and a resistor 24, which also may have a value on order of 1,000 ohms. The collector 20C of the transistor 20 is connected through a load resistor 26 to a source of operating potential, which may be on the order of −14 volts, by way of example. The collector 20C is also connected as one input to a NAND gate 28. The other input to the NAND gate 28 is a strobe signal from a source 29. Normally, the signal from the source 29 is at a potential near −14 volts, thus inhibiting output of the NAND gate. This signal level is taken to a potential near −9 volts when a mark or the absence thereof is passing under the photosensitive device, thus enabling the NAND gate at this time to respond to the other input in the presence of a mark, as will be described. As shown in the drawing, each detecting circuit has a utilizing circuit 30B through 30G.

Figure 2:
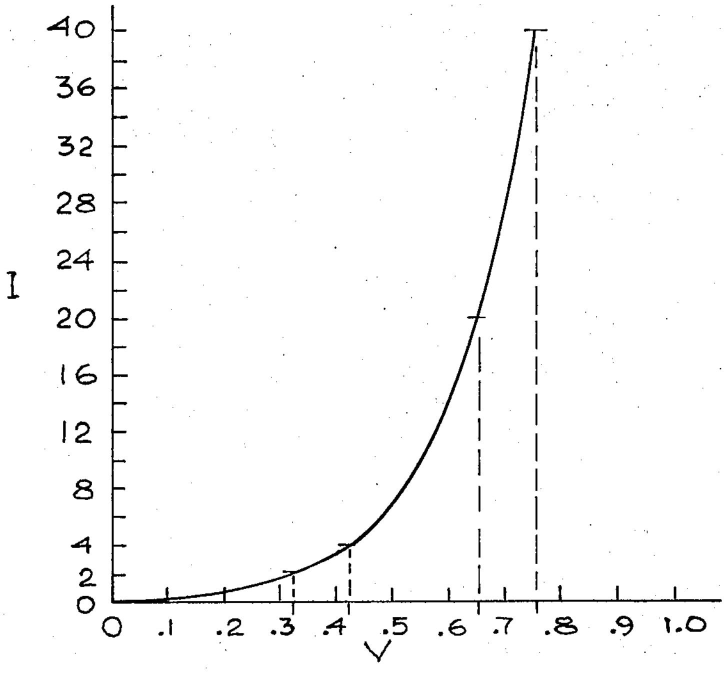
FIG. 2 illustrates a logarithmic curve shown to assist in an understanding of this invention.

To assist in an understanding of the operation of the invention, in FIG. 2, there is shown a curve representing a logarithmic characteristic. The ordinate represents the current which flows through the phototransistor, in response to different light levels and the abscissa represents the voltage output of the phototransistor and load combination, as a result of such current flow in the logarithmic load. It will be seen that a change in phototransistor current from 4 to 2 $\mu$A results in an output voltage change of 0.42 to 0.32, or −0.1 volt. Also, a change from 40 $\mu$A to 20 $\mu$A results in an output voltage change of 0.76 to 0.66, or −0.1 volt. Therefore, a mark which intercepts 50 percent of the light falling on the phototransistor produces the same output to the detecting circuit regardless of the individual sensitivity of the phototransistor or the efficiency of the light-emitting diode.

In prior art circuits, a change in phototransistor current from 40 $\mu$A to 20 $\mu$A would produce an output signal 10 times as great as would a current change from 4 $\mu$A to 2 $\mu$A. The large range of current amplitudes may be attributable to the factors previously enumerated, such as poor contrast with the background or card color, variation in the levels of illumination by whatever means are used to illuminate the card, variations in phototransistor response, etc. Despite this large range of current response, the voltage output of the logarithmically loaded phototransistor in accordance with this invention has a small range, and is therefore convenient to process in the following circuits.

Referring back to FIG. 1, the operational amplifier 18, has the property that it tries to equalize the level of its two inputs by means of its feedback path. Thus, when no mark is seen by the phototransistor, the level of its two inputs 18A, 18B, is approximately the same.

When the phototransistor 14 reads a mark on the card, the current flowing therethrough drops whereby its collector goes more positive.

Assuming its collector goes more positive by 10 millivolts, in order for the input 18B to change by 10 millivolts, the output voltage provided by the amplifier 18 must change by 3.3 volts, in view of the presence of the 330 K resistor 18 in the feedback path. This increase in voltage is sufficient to cause transistor 20 to conduct, and if the amplitude of the voltage provided at its collector is sufficient to equal the threshold level voltage of the NAND gate 28, an output is supplied to the utility circuit 30A. In other words, if the voltage resulting at the output of the amplifier 18, in response to the change in voltage provided by the phototransistor 14 exceeds a predetermined threshold, this is sensed as a mark on the card. In view of the fact that the phototransistor has a logarithmic response, a much greater range of variables commencing with the illumination sources and terminating with the phototransistor, can be tolerated, than was possible heretofore.

Accordingly, there has been described and shown hereinabove, a novel, useful and improved mark-sense circuit arrangement.

What is claimed is:

1. A circuit for reading the presence or absence of a mark on a card, the improvement comprising:
- phototransistor means positioned to receive and respond to light relfected from said card, said phototransistor means having an emitter and a collector,
- a bias source connected to said emitter,
- diode load means connected to said photoresponsive means to make its output vary logarithmically with its input,
- an operating potential source,
- means connecting said diode load means between said collector and said operating potential source, and
- threshold means for generating an output signal when said photoresponsive means output exceeds a predetermined threshold.

2. A circuit as recited in claim 1 wherein said threshold means includes an operational amplifier, and
- means to connect said phototransistor collector to said operational amplifier to drive said operational amplifier responsive to output from said phototransistor.

3. A circuit as recited in claim 1 wherein said load means is a transistor connected as a diode.

4. A circuit as recited in claim 3 wherein said transistor has base emitter and collector electrodes, and said base electrode is connected to said collector electrode.

* * * * *